No. 627,618. Patented June 27, 1899.
A. LECOMTE & I. LOESER.
APPARATUS FOR REGULATING PRESSURE OF AND DISTRIBUTING GAS.
(Application filed Dec. 5, 1898.)
(No Model.) 2 Sheets—Sheet 1.

Witnesses,
George M. Richards
G. H. Walmsley

Inventors
Auguste Lecomte
Isidore Loeser
by Wm. H. Babcock Atty

No. 627,618. Patented June 27, 1899.
A. LECOMTE & I. LOESER.
APPARATUS FOR REGULATING PRESSURE OF AND DISTRIBUTING GAS.
(Application filed Dec. 5, 1898.)
(No Model.) 2 Sheets—Sheet 2.
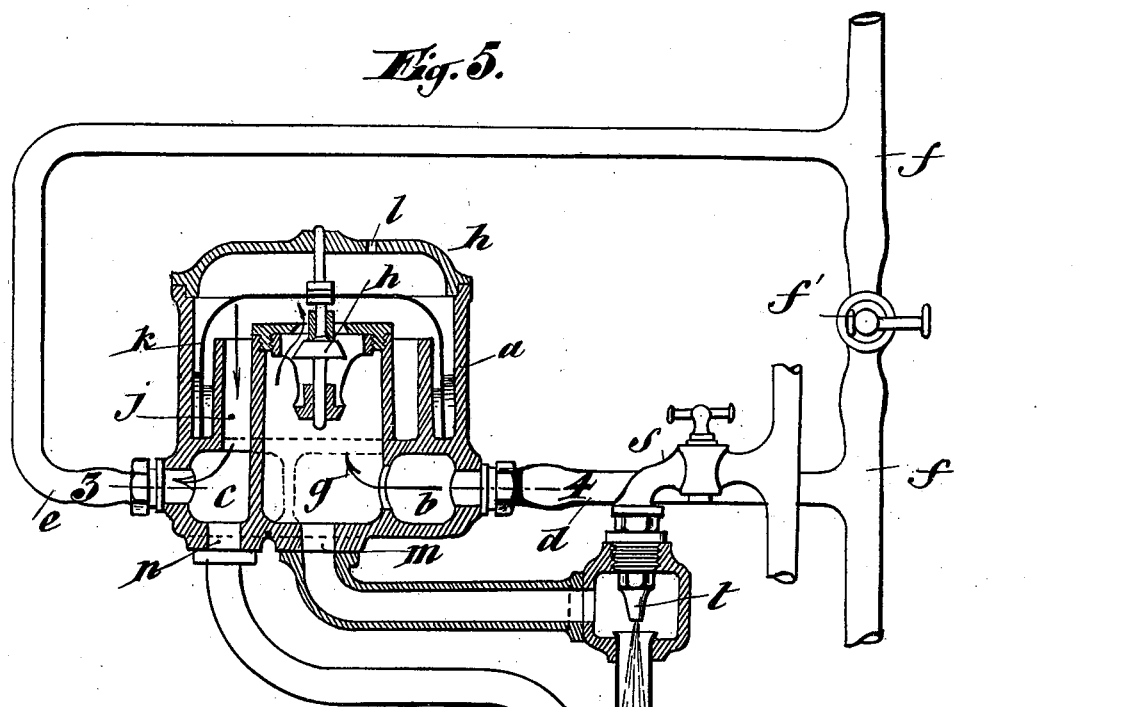
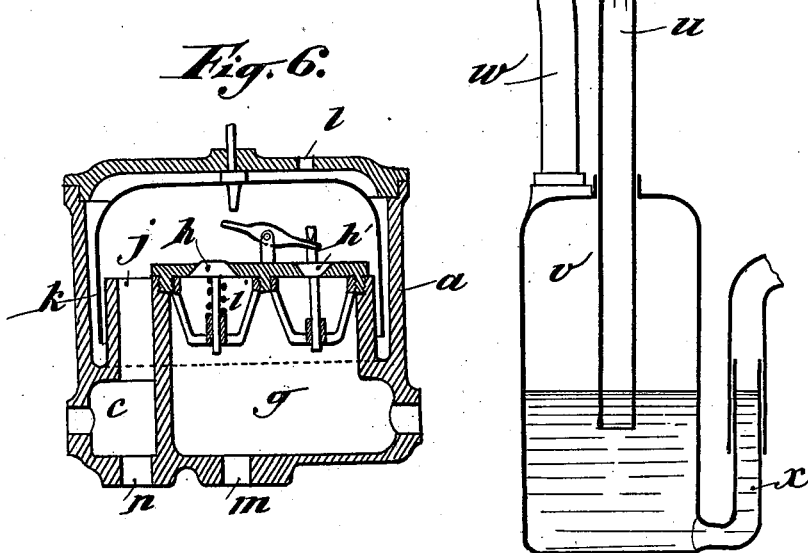

UNITED STATES PATENT OFFICE.

AUGUSTE LECOMTE AND ISIDORE LOESER, OF PARIS, FRANCE.

APPARATUS FOR REGULATING PRESSURE OF AND DISTRIBUTING GAS.

SPECIFICATION forming part of Letters Patent No. 627,618, dated June 27, 1899.

Application filed December 5, 1898. Serial No. 698,292. (No model.)

*To all whom it may concern:*

Be it known that we, AUGUSTE LECOMTE and ISIDORE LOESER, citizens of the Republic of France, residing at Paris, France, have invented certain new and useful Improvements in Apparatus for Regulating the Pressure of and Distributing Gas, of which the following is a specification.

This invention relates to an automatic gas distributer and regulator especially applicable to the compression appliances employed for increasing the pressure of the gas and intended to insure an automatic regulation of the distribution of the gas under pressure and an operation independent of all supervision.

In certain applications of heat, such as in soldering blowpipes and incandescent burners, the gas should be at a higher pressure than that at which it is generally distributed in the mains. For this purpose ventilators, pumps, water-injectors, &c., have been utilized; but all these appliances require the regulation, either by hand or in some other manner, of the speed of the compressing apparatus in such a manner that this speed may always be proportional to the volume of gas supplied. In addition to this, if the compressing apparatus be stopped it is necessary to operate a by-pass in order that the gas may continue to circulate in the main; but if the compressor stops for any reason and there be no one present to attend to it the passage of the gas is interrupted, and in cases in which the gas supplies lighting appliances the whole of the burners in the installation are extinguished. All these defects are obviated by means of the distributer and regulator which forms the subject of this invention, as it automatically regulates the distribution of the gas under pressure and requires no superintendence. It has the further advantage of being suitable for application to compressors of all kinds.

The accompanying drawings illustrate in principle and by way of example only the automatic distributer and regulator in two of its applications.

Figure 1:
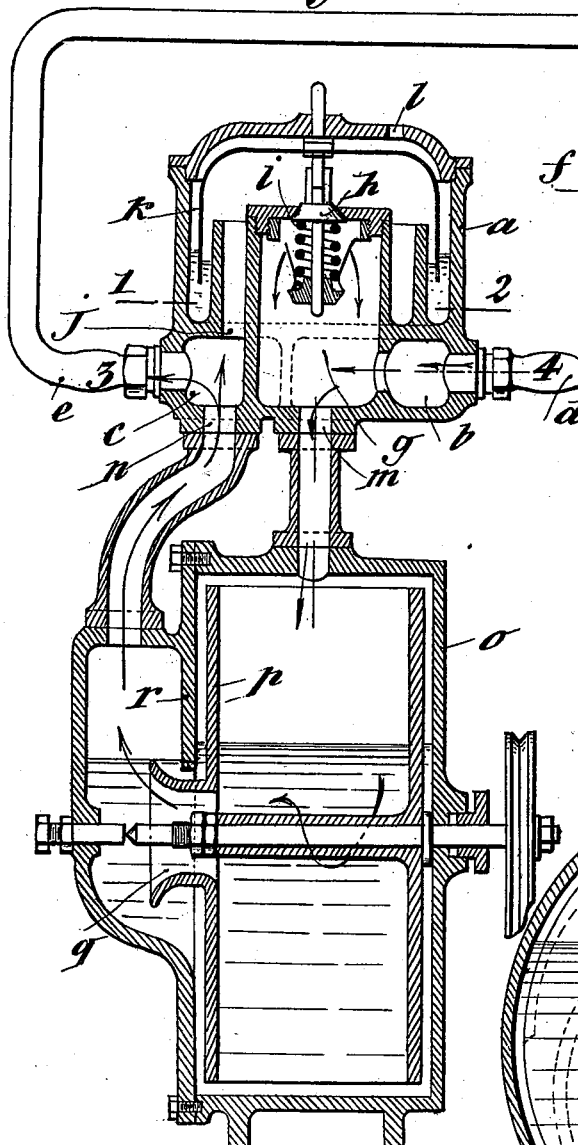
Figure 2:
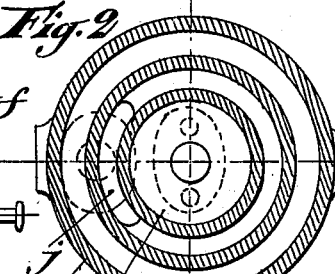
Figure 3:
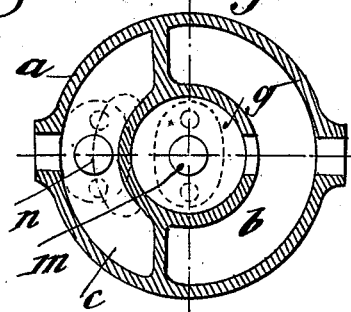
Figure 4:
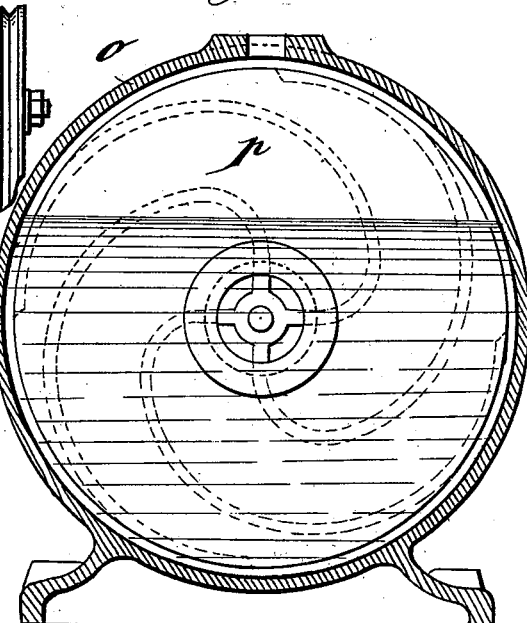

Figure 1 shows the apparatus in vertical section as applied to a mercury-exhauster. Figs. 2 and 3 are two horizontal sections through the distributer-regulator, taken upon the lines 1 2 and 3 4 of Fig. 1, respectively. Fig. 4 is a front elevation of the movable portion of the exhauster, the front face of the casing being removed. Fig. 5 shows the distributer-regulator applied to a water-injector. Fig. 6 represents a modification of the distributer-regulator.

In the figures similar letters of reference designate like parts.

The distributer-regulator consists, essentially, of a vessel $a$, in the lower portion of which are formed two compartments $b$ $c$, into which lead the inlet-pipe $d$ and the outlet-pipe $e$, respectively, both of these pipes leading from the vertical pipe $f$. A cock $f'$ is arranged in the vertical pipe between the two pipes $d$ and $e$ in such a manner as to enable the gas to be caused to pass either through the apparatus or directly through the vertical pipe.

The vessel $a$ comprises an internal chamber $g$, communicating, on the one hand, with the inlet-compartment $b$ and closed at its upper portion by a valve $h$, which is applied upon its seat by the action of a spring $i$. The tension of this spring is regulated in such a manner as to admit of the opening of the valve $h$ when the pressure within the chest $a$ rises above the pressure at which it is desired that the gas should issue from the apparatus. The interior of the vessel $a$ communicates with the outlet-compartment $c$ by means of the aperture $j$.

The stem of the valve $h$ of the said regulator passes through the center of dome or bell $k$, immersed in mercury or any other liquid which is contained in the annular space provided for this purpose within the vessel $a$. This bell or diaphragm is fastened on the said rod by a nut in the usual manner, or by soldering, or in any other convenient way. The weight of the bell is regulated in such a manner that it rises under a pressure slightly higher than the admission-pressure of the gas into the apparatus, but less than the pressure at which the gas leaves the same. This bell serves to effect the opening of the valve $h$ in case the pressure within the vessel $a$ falls below a certain limit. Communication of the internal chamber $g$ with the interior of the vessel $a$ may likewise be established by means of two valves $h$ $h'$, as shown in Fig. 6. The valve $h$ is then submitted to the action of a spring $i$, as above described, and upon this spring the bell $k$ exerts no action. The second valve $h'$, on the contrary, is closed and applied upon its seat by the pressure of the gas existing within the vessel $a$ and opens when this pressure falls under the combined action of the pressure of the gas coming from the main and acting upon its lower face and of the weight of the bell $k$, which raises it by means of an oscillating lever or of any other appropriate means. It will of course be understood that this dome or bell may be replaced by a flexible membrane, a bellows, or other equivalent device arranged in any suitable manner. The cover or lid of the apparatus is provided with an orifice $l$ in order to permit of displacement of the air during the displacement of the bell $k$.

The internal compartment $g$ is provided, in addition, with an aperture $m$, from which the pipe conducting the gas to the compressor leads. The gas under pressure, issuing from this latter, enters the compartment $c$ of the apparatus through the aperture $n$. The compressor may be of any suitable type and may be—for example, as shown in Figs. 1 and 4—a mercury-exhauster, constituted in the ordinary manner by a cylinder $o$, within which rotates, either in mercury or in some other suitable liquid, a tympanum or turbine wheel $p$. This latter in rotating compresses the gas successively in each of its compartments, and the gas so compressed issues through the aperture $q$, which is so formed as to present a raised edge or flange in order to facilitate the liberation of the gas and to employ only the minimum of liquid possible for obviating any danger of the bubbles of gas passing beneath the dividing-partition $r$ and entering the cylinder $o$.

The turbine wheel is mounted upon an axis with a stuffing-box, to which axis motion is imparted by a small motor of any suitable kind. Owing to the arrangement of the distributer-regulator, this axis is able to rotate always at the same speed, whatever may be the consumption of gas.

Fig. 5 shows the employment as a compressor of a water-injector. A cock $s$, arranged upon the water-pipe, permits of causing the water to enter the injection-nozzle $t$, arranged opposite the extremity of the tube $u$, into which the column of water draws the gas. This tube $u$ opens into the lower compartment $v$. The gas accumulates at the upper portion of this latter and is conducted through the pipe $w$ to the compartment $c$ of the distributer-regulator. The compartment $v$ is also provided with an overflow-pipe $x$.

This distributer-regulator operates in the following manner: We will assume that the ordinary pressure of the gas arriving by the vertical pipe is four centimeters and that the pressure should be sixteen centimeters upon leaving the distributer-regulator. The compressor should supply the excess of pressure—that is to say, a pressure of twelve centimeters. Under these conditions the spring $i$ of the valve $h$ (not shown in Fig. 5) is regulated in such a manner that this valve opens when the pressure within the vessel $a$ exceeds sixteen centimeters. The weight of the bell $k$, on the other hand, is regulated so that this latter rises with a pressure of from seven to eight centimeters—that is to say, a pressure somewhat in excess of the ordinary pressure of the gas, which should not be capable of raising the bell, and less than the pressure of the spring of the valve $h$, so that the pressure transmitted to the interior of the vessel $a$ through the aperture $j$ when the compressor is acting maintains the bell $k$ applied against the lid of the vessel $a$ and so that the valve $h$ is free to move. Everything being thus arranged in the position of repose, the bell $k$ and the valve $h$ occupy the position represented in Fig. 5. When the compressor is started, the gas enters the distributer-regulator at the same time by means of the apertures $n\,j$ and through the compartment $b$ and the internal chamber $g$, since the valve $h$ is open. The pressure then rises beneath the bell $k$ and exceeds the pressure equivalent to its weight. The bell $k$ then begins to rise; but at the same time that the bell rises the valve $h$ closes under the influence of its spring, the pressure then increasing continuously. When the bell reaches a certain point in its travel, the valve $h$ is completely closed, the bell continuing to rise until it touches the lid of the vessel $a$, then having the valve $h$ entirely free. So long as the pressure within the vessel $a$ does not exceed sixteen centimeters all remains in this condition; but if such pressure increases for any reason—for example, if some of the burners supplied are extinguished—the pressure increases beneath the bell $k$, and the valve $h$, acting as a regulator, falls under the influence of this excess of pressure. A portion of the gas thus returns to the compressor, and as this latter always produces the same volume whatever may be the consumption the pressure then falls within the vessel $a$ and within the outlet-compartment $c$ until the normal pressure is reëstablished. If the compressor stops, the pressure diminishing beneath the bell $k$, this latter descends and causes the valve $h$ to open. The gas then passes directly from the chamber $g$ to the interior of the vessel $a$ and of the compartment $c$. According to the position of the bell $k$ the valve $h$ fulfils different functions and performs in succession the office of regulating-valve and of distributing-valve.

The apparatus may operate with a liquid other than mercury. It is only necessary to furnish a sufficient hydraulic protection.

This distributer-regulator produces an extremely important and novel industrial effect, because it enables installations to be made, working with compressors actuated in any desired manner and without superintendence. In addition to this it is indispensable with water-injectors, because it enables these apparatus to be caused to act with a very low gas-pressure—fifteen to twenty centimeters, for example—without an excess of pressure in the injector being able to cause gas and water to issue at the same time from the overflow-pipe. Now it is well known that water-injectors give a much greater yield at low pressure than at high pressure.

Generally speaking, this distributer-regulator automatically produces the following operations: first, the automatic placing in circuit of the compressor when this latter is started and cutting off of the gas at ordinary pressure coming from the main; second, maintenance of the constant pressure which the gas possesses upon leaving the compressor, whatever may be the increase of speed of the motor, whatever the number of burners lighted may be, and even if all the burners are turned off, (in cases in which the gas under pressure is intended to supply incandescent gas-burners,) and, third, automatic cutting out of circuit of the compressor when this latter has stopped for any reason and at the same time reëstablishment of the direct passage of the gas from the main at its own pressure without restricting the section of the passage for the gas and without taking anything from the ordinary pressure of the gas, the burners not being extinguished during this operation.

It will of course be understood that this distributer-regulator may vary in form and dimensions and that its accessory arrangements may be varied according to the various applications of which it is capable.

Having fully described our invention, what we claim, and desire to secure by Letters Patent, is—

A pressure-regulator for fluid-compressors consisting of a casing containing two chambers, passages leading from one of said chambers and communicating respectively with the inlet to the compressor and the fluid-supply pipe, a passage leading from the other chamber and communicating with the outlet-pipe from the compressor, a passage connecting the two chambers and a valve controlling the same, means for normally holding said valve closed but allowing the compressed fluid to open it when the pressure thereof in the outlet-pipe exceeds that in the supply-pipe by a certain predetermined amount, a reciprocating bell or the like, exposed upon one side to the pressure of the fluid in the outlet-pipe, the other side of said bell being exposed to atmospheric pressure, and means connected with said bell whereby, when the pressure within the outlet-pipe becomes equal to or less than that in the supply-pipe, the said valve is caused to open, and when the pressure within the outlet-pipe exceeds that within the supply-pipe the valve is allowed to close, substantially as set forth.

In testimony whereof we have affixed our signatures in presence of two witnesses.

AUGUSTE LECOMTE.
ISIDORE LOESER.

Witnesses:
EDWARD P. MACLEAN,
GEO. E. LIGHT.